United States Patent [19]

Clancy et al.

[11] 4,252,451
[45] Feb. 24, 1981

[54] PRINT POINT REPOSITION FEATURE FOR AN ELECTRONIC TYPEWRITER

[75] Inventors: Douglas E. Clancy, Austin, Tex.; Carl F. Johnson; William R. McCray, both of Lexington, Ky.; Danny M. Neal, Austin, Tex.

[73] Assignee: International Business Machines Corporation, Armonk, N.Y.

[21] Appl. No.: 908,324

[22] Filed: May 22, 1978

[51] Int. Cl.³ .............................................. B41J 5/30
[52] U.S. Cl. .................................... 400/279; 400/290; 400/306; 400/309; 400/320; 400/697.1
[58] Field of Search ................... 400/62, 76, 279, 280, 400/290, 306, 309, 697.1, 320

[56] References Cited
U.S. PATENT DOCUMENTS

| 3,750,797 | 8/1973 | Hunt et al. ................... 400/320 X |
| 3,780,846 | 12/1973 | Kolpek et al. .................. 400/62 X |

Primary Examiner—Ernest T. Wright, Jr.
Attorney, Agent, or Firm—Laurence R. Letson

[57] ABSTRACT

On electronic typewriters which have the ability to record into a small working memory the escapement of the characters which are keyed at the keyboard, it is many times advantageous to be able to reposition the carrier at the rightmost end of the typed material automatically. This is particularly advantageous when it has been necessary to back the carrier up along the printed line for purposes of erasing, correcting or inserting material into that line. Disclosed herein is an electronic typewriter which is controlled by the electronic logic such that the depression of a selected control key will result in the carrier moving from a position within the typed text on a particular line to the right most position the carrier has occupied within that line during earlier typing.

This is accomplished by temporarily storing the rightmost carrier position as recorded in the escapement register into a working memory and then upon the appropriate command from the keyboard, using that location in the manner that a tab stop location would be used and creating a tab like command movement to cause the carrier to go directly to that point and stop.

3 Claims, 6 Drawing Figures

PRINT POINT REPOSITION FEATURE FOR AN ELECTRONIC TYPEWRITER

BACKGROUND OF THE INVENTION

In typewriters as they presently exist, whether they be electric powered or electronically controlled electric powered typewriters, when the operator causes the print point to move backward into the line of typing, for example, to correct an error or to remove an erroneous graphic from the page or to insert characters, the print carrier must be escaped rightward to the rightmost end of the print line before printing or typing may be resumed. Typically this is controlled by the operator by the use of functions such as tabulation and space. The use of the tabulation command necessitates the operator knowing exactly where the tabulation stops are located and the ability to then associate that location with the right most printed position on the typing line. This requires the operator to perform the operation consciously or alternatively to use the repeat space function and continue this operation through an extended period until the carrier has again assumed the desired position at the right most end of the typed material.

With the advent of proportional spacing typewriters and their increasing usage, the need to reposition the carrier very accurately is further necessitated and complicated by the fact that the characters in proportional spacing vary in width and therefore, the print point for the next character after the rightmost position of the typing line may well not correspond with a set or fixed character position. This will further compound the use of the tab and space routine described above since it will necessitate backspacing by one unit through one or more cycles to accurately place the carrier at the next character print point.

Even the routine of entering a tab stop prior to backing the carrier to the correction point will not work satisfactorily in the proportional spacing routine inasmuch as tab stops may only be set at predetermined character positions and cannot usually be set at individual escapement unit positions.

It is therefore an object of this invention to electronically control the carrier of a typewriter to place the print point immediately over the print point occupied at the rightmost position of the carrier in that particular writing line.

It is another object of this invention to control the print carrier to effect repositioning of the print point at the right most point in the typing line, by keyboard control.

It is still another object of this invention to simplify the demands on the operator in repositioning the carrier at the rightmost end of the writing line after the carrier has been positioned over a previous print point.

SUMMARY OF THE INVENTION

The reposition mode of operation in the electronic typewriter is accomplished after the print carrier has been moved backwards along the print line for correction or deletion of material or for some other reason and the operator wishes to continue typing starting to the right of the last printed character on that line. The operator may accomplish this rapid, effective rightward movement of the print point by the depression of an appropriate control key on the typewriter keyboard. This depression of the control key causes the electronic logic to go through a predetermined sequence of events and functions to control and command the carrier to move rightward and to stop at the exact position previously occupied by the carrier prior to the carrier having been reverse escaped along the writing line. This is accomplished in the electronics by the continual storing and updating in a register of a value representing the rightmost position of the carrier during any one writing line. Upon the command from the keyboard to reposition the print point over the right most previous print point on the writing line, the escapement value or line count value stored in this register is used as a temporary tab stop value. The information is retrieved from the reposition register and is used as a destination value and a tabulation operation is effected. With the tabulation routine being initiated and the rightmost position being used as a temporary tab stop value, the carrier will tabulate to that position and stop. At that point the typewriter is then again ready to resume normal typing.

DESCRIPTION OF THE INVENTION

Figure 1:
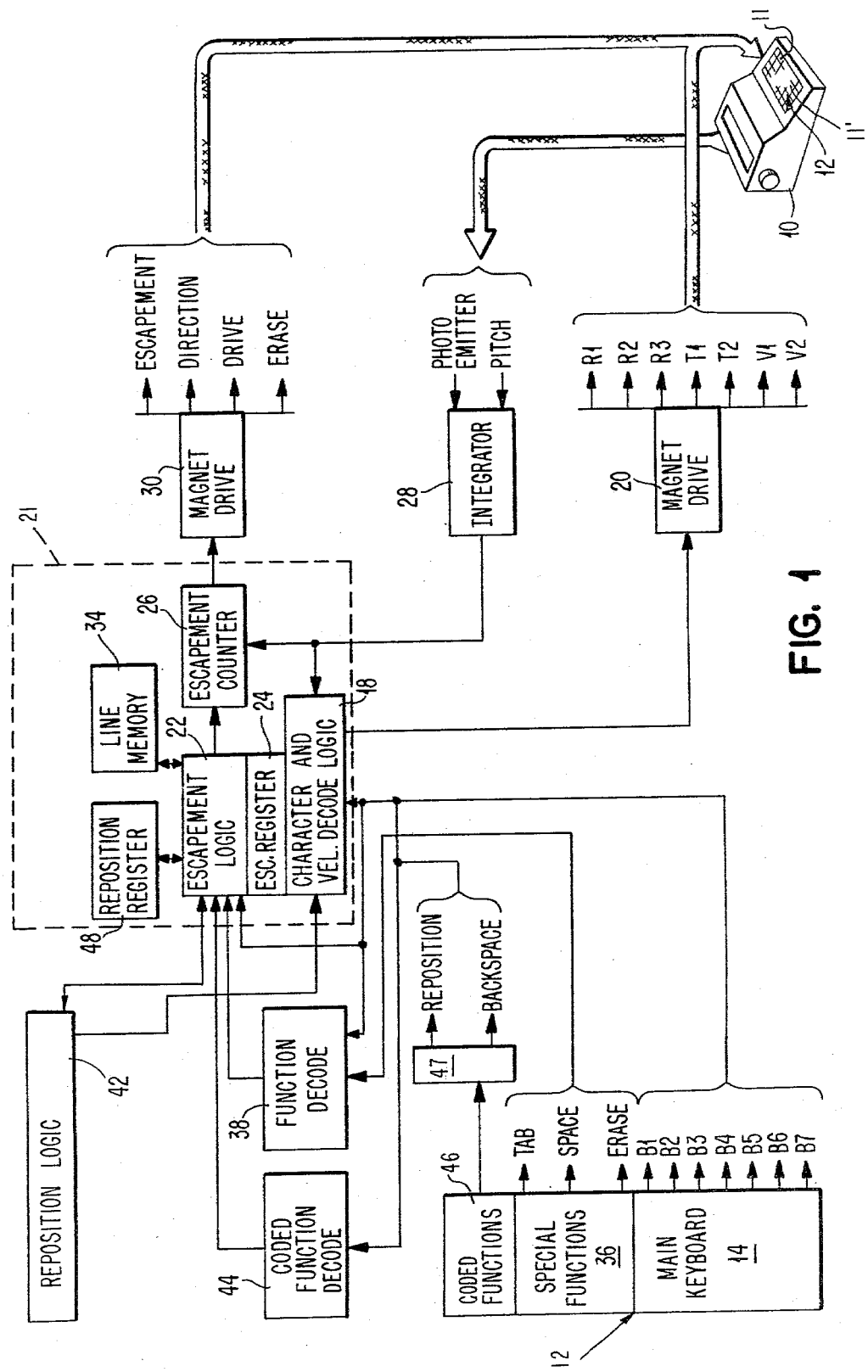
FIG. 1 is a block diagram representing the electronic controls in the system which operate a typewriter.
Figure 2:
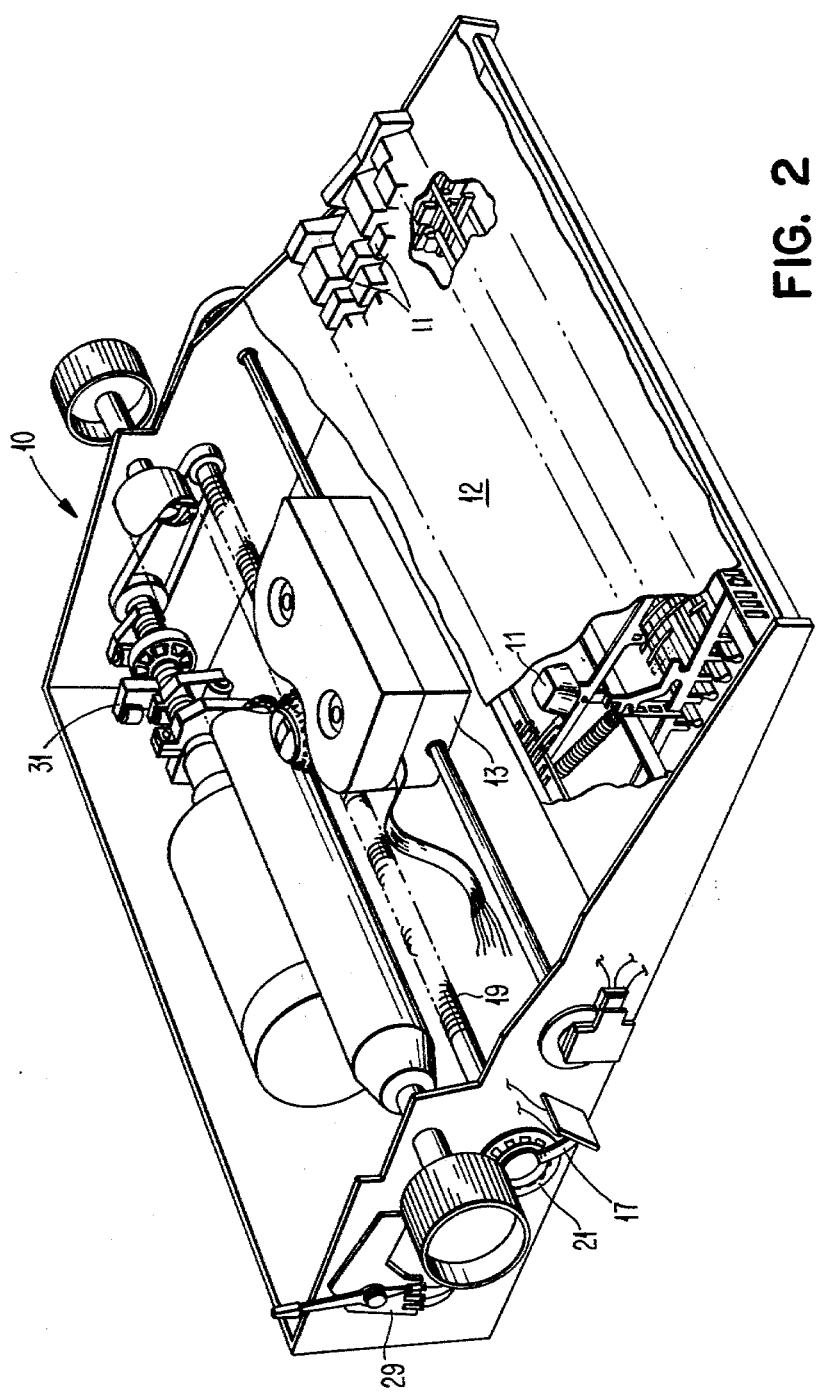
FIG. 2 illustrates the drive mechanism of the typewriter together with the appropriate inputs to the electronics and hardware of the printer itself.

For purposes of this discussion and disclosure, it is assumed that the typewriter or printer 10 is in operation, that typing has occured in a normal and conventional manner, and that the characters as they are typed are stored into a line memory 34 which upon a carrier return is cleared to provide the capability to store characters from the next line.

The operator from time to time may desire to make corrections in the text typed in that particular print line which are displaced from the print point by more than one character position. When this occurs, the carrier 13 may be backspaced until it is appropriately aligned with the erroneous character and the correction or deletion made. At this point, it is desirable to be able to return to the right most printing position on the typing line to resume typing in a normal manner. The typewriter 10 has a keyboard 12 which converts mechanical key movement to electrical signals B1-B7 and signals for tab, space, erase, backspace and reposition and outputs these signals from the main keyboard 14, special function section 36 and coded function section 46 which then send the electrical signals to the coded function decode 44, function decode 38 or character and velocity decode 18. In the case of characters, the character and velocity decode 18 outputs signals to the magnet drivers 20 which are data signal controlled switches to control electromagnets for operation of the mechanical controls to effect character selection and printing. Character selection and printing is accomplished through the magnet drivers 20 by controlling the electromagnets through signals R1, R2, R3, representing rotate codes, T1 and T2 representing tilt codes and V1 and V2 representing velocity codes. Different combinations of the signals R1-R3, T1, T2, V1 and V2 will result in different characters being selected by the rotate codes R1 through R3 and the tilt codes T1, T2, while the printing velocities V1 and V2 will determine the impact levels with which selected characters are printed. The special function section 36 outputs signals directly to the function decode 38 to control such operations as space, tab and erase.

Assuming that the typing has progressed under a normal course of events, the operator, through the coded functions section 46 of the keyboard 12 as illustrated in FIG. 1, may command one or several backspaces to effect the reverse positioning of the print carrier 13. The backspace function code is then transmitted to the coded function decode 44 which in turn provides an output to the escapement logic 22. The escapement logic 22 recognizing, that the command is a backspace command, will access the line memory 34 to determine that character in the immediately leftward print position. Upon the determination of that character, the escapement logic 22 then uses a table look up sequence to determine the escapement value assigned that character. Upon the determination of that value, the escapement register 24 is updated to reflect a destination equal to the present carrier position less the escapement value of the character accessed from the line memory 34. Upon the escapement logic 22 inserting the new value into the escapement register 24, the escapement counter 26 is loaded with a value corresponding to the distance that the carrier 13 must move during a particular cycle and the escapement logic 22 turns on the magnet drivers 30 to effect escapement reverse direction and drive. As the carrier 13 translates, the lead screw 19 rotates driving the carrier 13 and at the same time driving an emitter wheel 21 which when paired with a photoemitter/sensor 17 produces emitter pulses which when utilized together with a signal from the pitch selection mechanism 29 of the typewriter 10 passes through the integrator 28 to effect the decrementing of the escapement counter 26 to zero. As the escapement counter 26 reaches zero the magnet drivers 30 causing activation of magnets 31 and the movement of the carrier 13 are turned off.

After the backspacing has occured, either due to a backspace function or due to a correction function, the insertion or erase operation is performed by the operator.

In order to maintain data with respect to the rightmost position of the carrier 13 during any one typing line, the reposition register 48 is connected to and controlled by the escapement logic 22. As each escapement occurs during normal typing, the value of the escapement register 24 is stored in the reposition register 48. In the event that the escapement logic 22 performs a backspace the reposition register 48 is not decremented during such movement but remains at the previous value.

Upon a reposition command being keyboarded by the initiation of the alternate function output from the coded function section 46 and a predesignated alphanumeric key 11 of keyboard 12, the coded function decode 44 decodes the keyboard signals and translates them into signals which are then passed to the escapement logic 22. Block 47 of FIG. 1 merely illustrates that both reposition and backspace can be commanded from coded function section 46 and a respective predesignated key 11 of main keyboard 14 for each operation. Upon the receipt of the decoded reposition command the escapement logic 22 transfers control to the reposition logic block 42. The reposition logic block 42 then forces the value in the escapement register 24 to be subtracted from the value in the reposition register 48. The resulting difference, under the control of the reposition logic block 42 acting through the escapement logic 22 is stored into the escapement counter 26 resulting in the turning on of the magnet drivers 30 to effect escapement, forward direction and drive. As the carrier 13 moves, feedback from the printer 10 in the form of the photoemitter/sensor pulses and pitch selection signal passed through the integrator 28 will decrement the escapement counter 26 until the escapement counter 26 reaches zero thus turning off the magnet drives 30. Upon the turning off of the magnet drives 30, the carrier 13 will occupy a position which is identical to the position occupied at the rightmost point in that typing line during the previous typing operations and corresponding to the value in the reposition register 48. Upon the loading of the delta distance between the reposition register 48 value and the escapement register 24 value, the escapement logic 22 will also load the reposition register 48 value into the escapement register 24 so that at the end of the reposition operation the escapement register 24 will accurately represent the position of the carrier 13 on the typing line.

Figure 3:
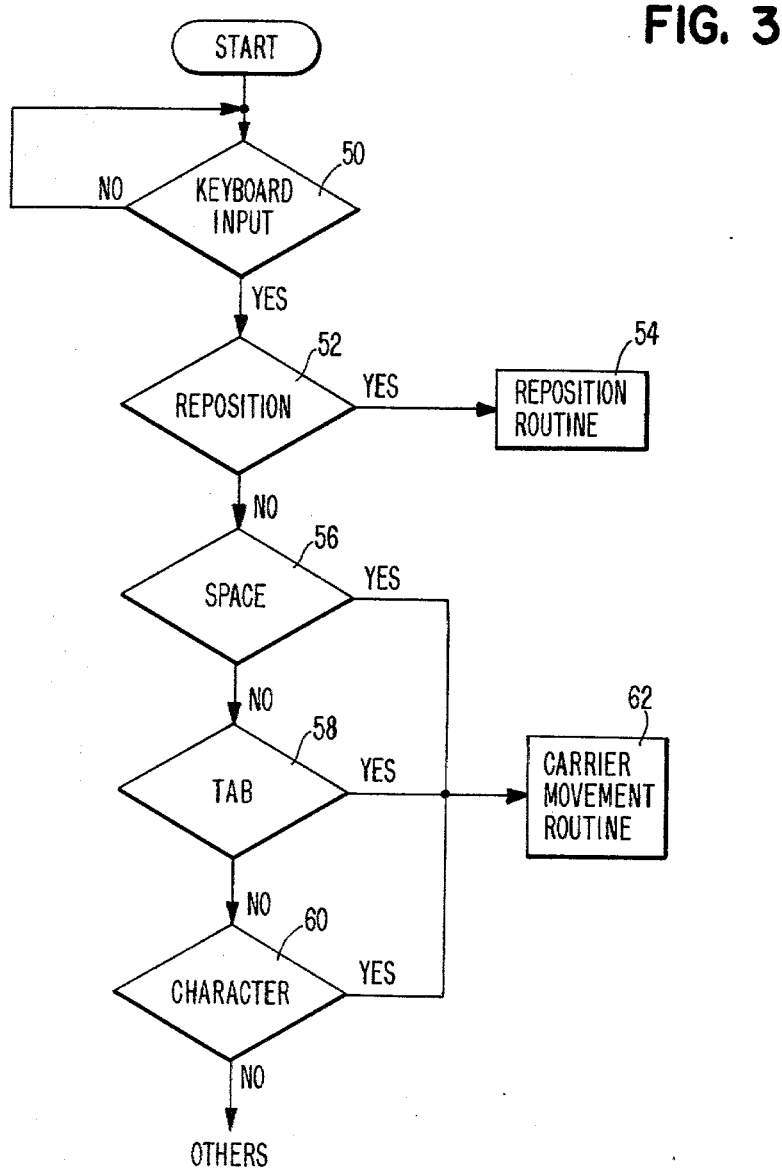
FIGS. 3 through 5 are flow diagrams of the logic flows which the electronics in FIG. 1 perform to appropriately command the drive and printing mechanisms of the typewriter.
Figure 4:
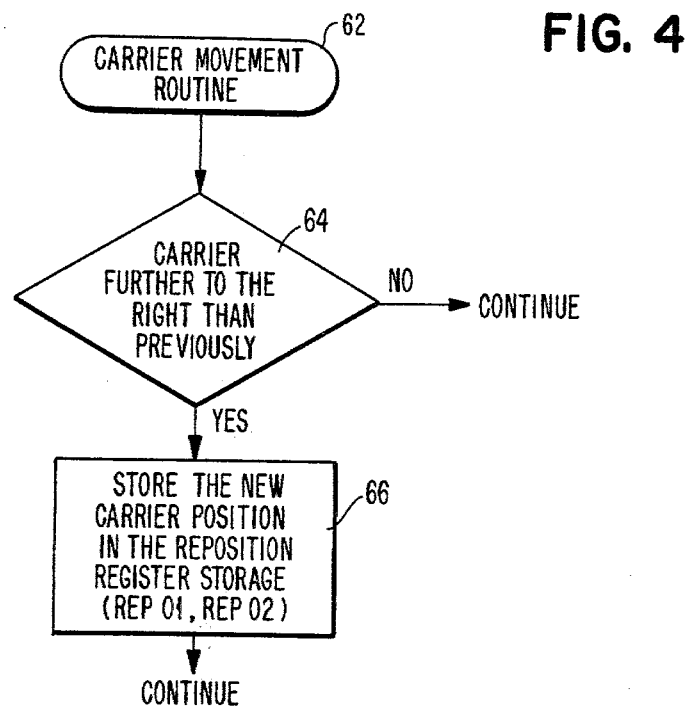
Figure 5:
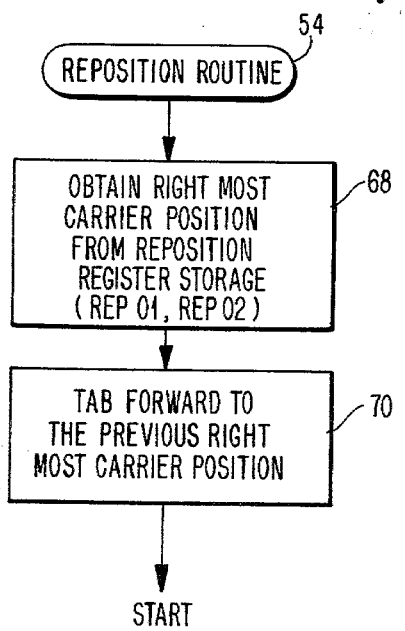

The controls necessary to control the typewriter 10 which have been explained above in block diagram form is preferably embodied in operational sequences of the electronic logic and devices which may be represented by the flow charts in FIGS. 3 through 5. To more fully understand the operational sequences in logical controls which are part of the block diagram in FIG. 1 reference is made to FIGS. 3, 4 and 5. Referring to FIG. 3 the main flow for the logic contained in the reposition logic block 42 of FIG. 1 is illustrated in conventional flow chart form. Upon the receipt of any command or signal, the logic will determine whether the signal is a keyboard input 50. If the signal is not a keyboard input 50 then the routine continues to wait for a keyboard input by branching through the "no" path and checking the next signal received. When a keyboard input signal is received the "yes" path is followed and the signal is checked to determine whether it represents a reposition command 52. If the signal is a reposition command 52 then the flow will branch to the reposition routine 54. This will be discussed more fully below. If the command received is not a reposition routine command 52 the "no" path is followed. If the command is detected to be a space 56, a tab 58, or a character 60, the logic will then branch to the carrier movement routine 62. If the signal which has been determined not to be a reposition signal 52 is determined not to be a space 56, tab 58, or character 60 then the logic flow follows the negative paths to other routines for detection and operation.

As described above, if the signal is determined not to be a reposition signal 52 but is determined to be either a space 56, tab 58 or character 60 the logic branches to the carrier movement routine 62 which will be described with respect to FIG. 4. As a result of entering the carrier movement routine 62, a decision is made as to whether the position of the carrier 13 as a result of the space 56, tab 58 or character 60 command will be further to the right than any position previously occupied by the print carrier 13 during that typing line 64. If that decision 64 is "no" then the logic flow is branched to other routines which are not relevant to this invention.

If the determination 64 is made that the carrier 13 will occupy a position to the right of any position previously occupied on that typing line the "yes" path is followed 66 and the new carrier position as represented by the escapement counter 26 will be stored into the reposition register 48 (Repo 1 and Repo 2).

Upon the storage of this position into the reposition register 48, the carrier movement routine 62 FIG. 4 for reposition is exited and other functions of the typewriter 10 not essential to this invention are performed.

At a later time when the operator enters a reposition command from the keyboard 12 by use of the coded function section 46 and the predesignated alphanumeric keyboard key 11' of keyboard 12, the reposition routine 54 is entered. Upon the entering of the reposition routine command, the logic will retrieve 68 or obtain the rightmost carrier position for that typing line from the reposition register 48 (Repo 1, Repo 2). Upon the obtaining of that information, the information contained therein is utilized as a temporary tab stop and the routine effects a tab forward to that position 70; which is the previous rightmost carrier position in the typing line. Upon the commanding of the tabulation function to the temporary tab stop location, the routine will then return to start 50 and await further commands.

The embodiment which this invention may take may be in one of several alternative forms. One form described above in conjunction with the block diagrams and flow charts illustrates one embodiment. An alternative embodiment may be an electronic processor control equivalent to the elements in electronics 21 which may operate in conjunction with a permanently configured read only storage equivalent to reposition logic 42 and the code representing the flow diagrams in FIGS. 3, 4 and 5 represented by the instructions of Appendices A-D in which a series of instructions and codes may be stored. This electronic apparatus would correspond to the apparatus as described in conjunction with FIGS. 1 through 5.

In such cases, an alternative to the flow diagrams illustrated in FIGS. 3 through 5, codes or commands may be stored in the read only storage to cause the electronics 21 to process the information from the keyboard 12 and to control the printer 10 in a predetermined sequence of steps. The command and codes stored in the read only storage may take the form of those attached in Appendix A and Appendix B. Appendix A is a listing of definitions which identify and are associated with particular registers or particular bits within a byte and equates those register designations and/or bit designations with mnemonics.

Figure 6:
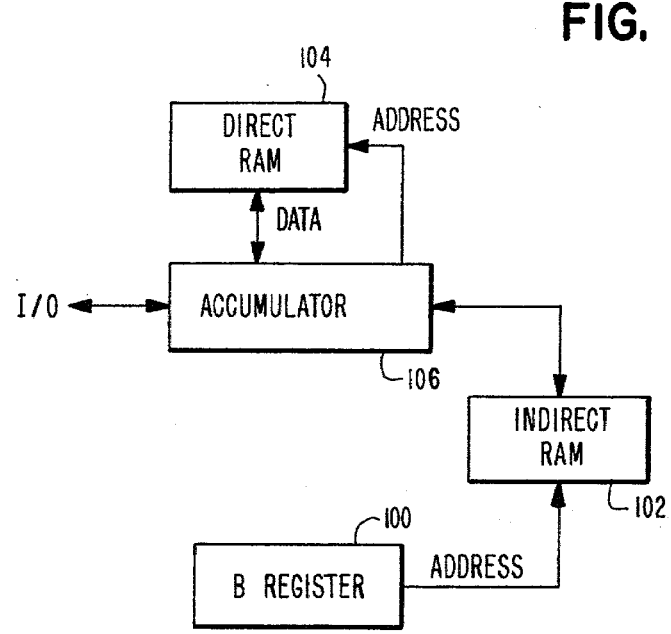
FIG. 6 is an illustration of the connections of internal registers.

The particular register referred to above may be any storage locations in memory in conjunction with the structure of FIG. 6 and are not necessarily fixed.

Appendix B is the complete listing of a set of instructions which serve to control the processor equivalent to box 21 and reposition logic 42 and may be programed or coded as desired in order to control the electronic processor. Particular embodiments of the code or instructions may be modified as desired by one skilled in the art to accomplish the particular functions of the invention. Additionally, it should be recognized that a programmable processor may embody a program which may be written conforming to the requirements of that processor for accomplishing the same result.

Referring to Appendix B, Column 1 is the address, in hexadecimal code, where that particular instruction is stored in the location designated by the corresponding information in Column 1. Column 3 is the mnemonics identifying the start point of particular sub-routines.

Column 4 is the mnemonics for the instruction which the processor then executes. Column 5 contains mnemonics which then, through definitions and equality statements in Appendix A assigns numerical values for registers or bits as appropriate for the instructions contained in Column 4. Column 6 are explanatory comments.

Appendix C includes a listing of the instructions, the mnemonics representing these instruction and two columns designated respectively first byte and second byte having also bit positions indicated numerically.

With reference to those bytes illustrated in the two byte columns, these represent how that particular instruction would appear in the read only storage memory. The ones and zeros in those bytes are dedicated values which remain unchanged for that particular instruction while the B contained in the instruction code indicates the bits to be tested and the A's are representative of the address to which the instruction series will branch upon the meeting of particular conditions set forth, depending upon whether the bits B are represented by a one or zero. Referring to other instructions, the letter D represents a fixed value in memory and is determined by the individual implementing the particular device.

The R's are representative of the numerical designation for one of thirty-two separate registers which are available for storage of data and which are available to the processor, the registers being arbitrary designations for random storage and not fixed designated registers or storage.

Appendix D includes an instruction summary which lists the mnemonic, the name of the instruction represented by the mnemonics and a brief description of the function performed by the processor as a result of that particular instruction.

As an aid to understanding the description of the instructions contained in Appendix D, a reference should be made to FIG. 6 which is illustrative of the flow of the instruction between register 100, memories 102, 104 and the accumulator 106.

While the invention has been particularly shown and described with reference to preferred embodiments thereof, it will be understood by those skilled in the art that the foregoing and other changes in form and details may be made therein without departing from the spirit and scope of the invention.

| APPENDIX A | | |
|---|---|---|
| MTARG | EQUALS 0 | SUBADDRESS OF PAST CARRIER POSITION |
| LTARG | EQUALS 1 | ADDRESS OF PAST CARRIER POSITION |
| LCNT | EQUALS 2 | ADDRESS OF PRESENT CARRIER POSITION |
| MINI | EQUALS 3 | SUBADDRESS OF PRESENT CARRIER POSITION |
| MLCNT | EQUALS 4 | MEMORY LINE COUNT, ADDRESS LINE MEMORY |
| KBD | EQUALS 5 | KEYBOARD REGISTER |
| PM | EQUALS 6 | PRINTER MAGNET REGISTER, REPRESENTS OUTPUT TO PRINTER |

APPENDIX A

| | | |
|---|---|---|
| REVMAG | EQUALS 1 | REVERSE MAGNET |
| SENSOR | EQUALS 7 | REGISTER THAT CONTAINS INPUT SENSORS |
| EMT | EQUALS 2 | EMITTER REPRESENTS ONE UNIT OF ESCAPEMENT |
| ECNT | EQUALS 8 | UNITS OF ESCAPEMENT REGISTER |
| WK1 | EQUALS 9 | WORKING REGISTER |
| ESCTABL | EQUALS 100 | TABLE THAT CONTAINS ESCAPEMENT VALUES OF CHARACTERS |
| VELTABL | EQUALS 200 | TABLE THAT CONTAINS VELOCITY VALUE OF CHARACTERS |
| ERTAPE | EQUALS 3 | ERASE TAPE LIFT MAGNET |
| VELMAG | EQUALS 4 | MAGNET THAT SELECTS VELOCITY OF IMPACT |
| CHARMAG | EQUALS 5 | MAGNET THAT SELECTS CHARACTER |
| B1 | EQUALS 0 | FIRST BAIL FROM KEYBOARD |
| B2 | EQUALS 1 | SECOND BAIL FROM KEYBOARD |
| B3 | EQUALS 2 | THIRD BAIL FROM KEYBOARD |

APPENDIX B

| | | | | | |
|---|---|---|---|---|---|
| 0000 | 8B | START | LR | SENSOR | IS THERE AN INPUT FROM KEYBOARD |
| 0001 | E000 | | TJN | STRB,START | |
| 0003 | ABFF | | LBD | KBDS | |
| 0005 | B0 | | LN | 0 | |
| 0006 | 05 | | STR | KBD | |
| 0007 | ABCC | | LBD | X'CC' | REPOSITION INPUT? |
| 0009 | 402F | | CJE | REPO | |
| 000B | ABF8 | | LBD | X'F8' | SPACE INPUT? |
| 000D | 401B | | CJE | MOVE | |
| 000F | ABFA | | LBD | X'FA' | TAB INPUT? |
| 0011 | 401B | | CJE | MOVE | |
| 0013 | E01B | | TJN | B1,MOVE | CHARACTER INPUT? |
| 0015 | E41B | | TJN | B2,MOVE | |
| 0017 | E81B | | TJN | B3,MOVE | |
| 0019 | 2084 | | BR | OTHERS | |
| 001B | A6 | MOVE | LBR | REPO1 | IS THE CARRIER FARTHER TO THE RIGHT |
| 001C | 82 | | LR | LCNT | THAN PREVIOUSLY? |
| 001D | 6084 | | CJL | OTHERS | |
| 001F | 4023 | | CJE | CMR2 | |
| 0021 | 2029 | | BR | CMR1 | |
| 0023 | A7 | CMR2 | LBR | REPO2 | |
| 0024 | 83 | | LR | MINI | |
| 0025 | 6029 | | CJL | CMR1 | |
| 0027 | 2084 | | BR | OTHERS | |
| 0029 | 82 | CMR1 | LR | LCNT | UPDATE THE RIGHT MOST CARRIER POSITION |
| 002A | 06 | | STR | REPO1 | |
| 002B | 83 | | LR | MINI | |
| 002C | 07 | | STR | REPO2 | |
| 002D | 2084 | | BR | OTHERS | |
| 002F | 86 | REPO | LR | REPO1 | FIND THE RIGHT MOST CARRIER POSITION |
| 0030 | 02 | | STR | LCNT | |
| 0031 | 09 | | STR | WK1 | |
| 0032 | 87 | | LR | REPO2 | |
| 0033 | 00 | | STR | WK2 | |
| 0034 | 03 | | STR | MINI | |
| 0035 | 89 | P1 | LR | WK1 | CALCULATE DISTANCE TO TRAVEL BACK |
| 0036 | AF | | S1 | | |
| 0037 | 09 | | STR | WK1 | |
| 0038 | 82 | | LR | LCNT | |
| 0039 | AF | | S1 | | |
| 003A | 02 | | STR | LCNT | |
| 003B | AB00 | | LBD | X'0' | WK1 CONTAINS LARGE DISTANCE |
| 003D | 4041 | | CJE | P2 | |
| 003F | 2035 | | BR | P1 | |
| 0041 | 8C | P2 | LR | WK2 | |
| 0042 | AE | | A1 | | |
| 0043 | AE | | A1 | | |
| 0044 | AE | | A1 | | |
| 0045 | AE | | A1 | | |
| 0046 | AE | | A1 | | |
| 0047 | 0C | | STR | WK2 | |
| 0048 | 89 | | LR | WK1 | |
| 0049 | AF | | S1 | | |
| 004A | 09 | | STR | WK1 | |
| 004B | 8C | P3 | LR | WK2 | WK2 CONTAINS SHORT DISTANCE |
| 004C | AF | | S1 | | |
| 004D | 0C | | STR | WK2 | |
| 004E | 83 | | LR | MINI | |
| 004F | AF | | S1 | | |
| 0050 | 03 | | STR | MINI | |

APPENDIX B

| | | | | | |
|---|---|---|---|---|---|
| 0051 | AB00 | | LBD | X'0' | |
| 0053 | 404B | | CJE | P3 | |
| 0055 | 89 | P4 | LR | WK1 | SAVE CALCULATED DISTANCE FOR RETURN |
| 0056 | 0D | | STR | WK5 | |
| 0057 | 8C | | LR | WK2 | |
| 0058 | 0E | | STR | WK6 | |
| 0059 | 8A | | LR | PM | MOVE CARRIER BACKWARD |
| 005A | 59 | | SBS | REVMAG | |
| 005B | 5B | | SBS | ESCMAG | |
| 005C | 8B | P5 | LR | SENSOR | TRAVEL MINI DISTANCE |
| 005D | E85C | | TJN | EMT,P5 | |
| 005F | 8C | | LR | WK2 | |
| 0060 | AF | | S1 | | |
| 0061 | 0C | | STR | WK2 | |
| 0062 | AB00 | | LBD | X'0' | |
| 0064 | 4068 | | CJE | P6 | |
| 0066 | 205C | | BR | P5 | |
| 0068 | 75 | P6 | LDL | 5 | |
| 0069 | 0F | | STR | WK3 | |
| 006A | 8B | P7 | LR | SENSOR | TRAVEL MAXI DISTANCE |
| 006B | C86A | | TJE | EMT,P7 | |
| 006D | 8F | | LR | WK3 | |
| 006E | AF | | S1 | | |
| 006F | 0F | | STR | WK3 | |
| 0070 | AB00 | | LBD | X'0' | |
| 0072 | 4076 | | CJE | P8 | |
| 0074 | 206A | | BR | P7 | |
| 0076 | 89 | P8 | LR | WK1 | |
| 0077 | AF | | S1 | | |
| 0078 | 09 | | STR | WK1 | |
| 0079 | AB00 | | LBD | X'0' | |
| 007B | 407F | | CJE | P9 | |
| 007D | 2068 | | BR | P6 | |
| 007F | 8A | P9 | LR | PM | TRAVEL FINISHED |
| 0080 | 51 | | RBS | REVMAG | |
| 0081 | 53 | | RBS | ESCMAG | |
| 0082 | 2000 | | BR | START | |
| 0084 | AC | OTHERS | H | | |

APPENDIX C

| INSTRUCTION | MNEUMONIC | FIRST BYTE | | | | | | | | SECOND BYTE | | | | | | | |
|---|---|---|---|---|---|---|---|---|---|---|---|---|---|---|---|---|---|
| | | 8 | 7 | 6 | 5 | 4 | 3 | 2 | 1 | 8 | 7 | 6 | 5 | 4 | 3 | 2 | 1 |
| TEST BIT - JUMP EQUAL | TJE | 1 | 1 | 0 | B | B | B | A | A | A | A | A | A | A | A | A | A |
| TEST BIT - JUMP NOT EQUAL | TJN | 1 | 1 | 1 | B | B | B | A | A | A | A | A | A | A | A | A | A |
| COMPARE - JUMP EQUAL | CJE | 0 | 1 | 0 | 0 | A | A | A | A | A | A | A | A | A | A | A | A |
| COMPARE - JUMP LESS | CJL | 0 | 1 | 1 | 0 | A | A | A | A | A | A | A | A | A | A | A | A |
| BRANCH | BR | 0 | 0 | A | A | A | A | A | A | A | A | A | A | A | A | A | A |
| LOAD DIRECT LOW | LDL | 0 | 1 | 1 | 1 | D | D | D | D | | | | | | | | |
| LOAD DIRECT HIGH | LDH | 1 | 0 | 1 | 0 | 1 | 0 | 0 | 1 | D | D | D | D | D | D | D | D |
| LOAD REGISTER | LR | 1 | 0 | 0 | R | R | R | R | R | | | | | | | | |
| LOAD INDIRECT | LN | 1 | 0 | 1 | 1 | A | A | A | A | | | | | | | | |
| LOAD B DIRECT | LBD | 1 | 0 | 1 | 0 | 1 | 0 | 1 | 1 | D | D | D | D | D | D | D | D |
| STORE REGISTER | STR | 0 | 0 | 0 | R | R | R | R | R | | | | | | | | |
| STORE INDIRECT | STN | 1 | 0 | 1 | 0 | 1 | 0 | 0 | 0 | | | | | | | | |
| SET BIT AND STORE | SBS | 0 | 1 | 0 | 1 | 1 | B | B | B | | | | | | | | |
| RESET BIT AND STORE | RBS | 0 | 1 | 0 | 1 | 0 | B | B | B | | | | | | | | |
| INCREMENT | A1 | 1 | 0 | 1 | 0 | 1 | 1 | 1 | 0 | | | | | | | | |
| DECREMENT | S1 | 1 | 0 | 1 | 0 | 1 | 1 | 1 | 1 | | | | | | | | |
| NO OPERATION | NOP | 1 | 0 | 1 | 0 | 1 | 1 | 0 | 1 | | | | | | | | |
| EMITTER | ER | 1 | 0 | 1 | 0 | 1 | 0 | 0 | 1 | | | | | | | | |

APPENDIX D

Instruction Summary

| Mnemonic | Name | Description |
|---|---|---|
| TJE B,A | Test Bit - Jump Equal | Test bit B in the accumulator and when on, branch to A. |
| TJN B,A | Test Bit - Jump Unequal | Test bit B in the accumulator and when off branch to A. |
| CJE R,A | Compare - Jump Equal | Compare byte R in B register with accumulator and when equal branch to A. |
| CJL R,A | Compare - | Compare accumulator to byte |
| | Jump Low | R in B register and when accumulator is less than R branch to A. |
| BR A | Branch | Branch to A. |
| J A | Jump | Jump to A. |
| LDL D | Load Direct Low | Load low half of the accumulator from the instruction. Zero high half. |

APPENDIX D

Instruction Summary

| Mnemonic | Name | Description |
|---|---|---|
| LDH D | Load Direct | Load the accumulator from the instruction. |
| LR R | Load Register | Load accumulator from direct memory. Place direct memory address in storage address Register. |
| LBR R | Load B Register | Load the B Register from direct memory. |
| LN A | Load Indirect | Load the accumulator from indirect memory. (Address given by B Register and 4 bits of the instruction.) |
| STR R | Store Register | Store the accumulator in direct memory. Place direct memory address. |
| STN | Store Indirect | Store the accumulator in indirect memory (Address in Register.) |
| SBS B | Set Bit and Store | Set bit B in direct memory (address in Storage Address Register) to 1. |
| RBS B | Reset Bit and Store | Set bit B in direct memory (address in Storage Address Register) to 0. |
| A1 | Increment | Add one to the accumulator. |
| S1 | Decrement | Subtract one from the accumulator. |
| NOP | No Operation | Go to next instruction. |
| ER | Emitter Reset | Reset Emitter latch. |

We claim:

1. A repositioning control for a typewriter, said typewriter having a keyboard for control signal input for function control and character selection, backspace control means associated with said keyboard to accomplish retrogressive escapement, print point defining means moveable to define a writing line;

escapement means for moving said print point defining means along said writing line, thereby defining a print point;

escapement control means for controlling said escapement means to move said print point in response to keyboard commands;

said escapement control means comprising means for maintaining a numerical value indicative of the location of said print point with respect to said writing line; and means for storing the largest of said numerical values of said locations on a continuing basis; said escapement control means further comprising:

means for retrieving said stored largest numerical value, reposition means responsive to a keyboard command for causing said retrieving means to retrieve said stored largest numerical value, and for causing said escapement control means to operate said escapement means to move said print point defining means directly to a position wherein said print point location corresponds to the position previously occupied by said print point on said writing line, and that position corresponding to said stored largest numerical value.

2. The repositioning control for a typewriter as in claim 1 wherein, said reposition means further comprises means for determining the difference between said numerical value indicative of said print point and said stored largest numerical value and register means for storing a value corresponding to said difference, and for enabling said escapement means when said register means contains a value.

3. The repositioning control of claim 2 wherein said escapement control means further comprises means for producing indications of movement of said print point in response to said enablement of said escapement means, and means responsive to said indications of movement for reducing said difference in amounts corresponding to displacement of said print point defining means.

* * * * *